Dec. 11, 1962 F. PERNACK ETAL 3,067,733
WHEEL TRIMMER
Filed March 16, 1960 3 Sheets-Sheet 1

INVENTORS
FRANK PERNACK
ARTHUR B. BASSOFF
BY
ATTORNEYS

Dec. 11, 1962   F. PERNACK ETAL   3,067,733
WHEEL TRIMMER
Filed March 16, 1960   3 Sheets-Sheet 2

INVENTORS
FRANK PERNACK
BY ARTHUR B. BASSOFF
*Whittemore,*
*Hulbert & Belknap*
ATTORNEYS Dec. 11, 1962   F. PERNACK ETAL   3,067,733
WHEEL TRIMMER Filed March 16, 1960   3 Sheets-Sheet 3

INVENTORS
FRANK PERNACK
ARTHUR B. BASSOFF
BY
ATTORNEYS

United States Patent Office 3,067,733
Patented Dec. 11, 1962

3,067,733
WHEEL TRIMMER
Frank Pernack, Birmingham, and Arthur B. Bassoff, Detroit, Mich., assignors to National Broach & Machine Company, Detroit, Mich., a corporation of Michigan
Filed Mar. 16, 1960, Ser. No. 15,370
22 Claims. (Cl. 125—11)

The present invention relates to a trimmer for a grinding wheel, and more particularly to a trimmer designed to trim one or both peripheral edge portions of a grinding wheel to a contour appropriate to the profile of a gear tooth such for example as an involute profile.

It is an object of the present invention to provide a wheel trimmer including a templet, an elongated member having a templet follower or stylus at one end and a diamond trimming element at the other end, and means for effecting translation of said elongated member in a direction transverse to its length with the stylus in contact with the templet so as to produce movement of the diamond trimming element in a path identical to the form of the templet.

It is a further object of the present invention to provide trimming mechanism as described in the preceding paragraph which includes linkage mechanism for supporting the elongated member for movement as described above.

It is a further object of the present invention to provide trimmer mechanism including a parallel linkage device for supporting a templet, stylus and diamond trimmer member for movement.

It is a further object of the present invention to provide a wheel trimmer comprising a support, a slide mounted for adjustment on said support in a direction parallel to the axis of the grinding wheel, and a carrier pivoted to said slide for angular adjustment about an axis perpendicular to the axis of the grinding wheel.

It is a further object of the present invention to provide a wheel trimmer including a transversely and an angularly adjustable carrier, an elongated housing mounted on said carrier for movement in a direction transverse to its length, a shaft slidably mounted in said housing and having a templet following stylus at one end and a diamond trimmer at the other end, and a templet adjustably mounted on said carrier.

It is a further object of the present invention to provide a trimmer of the character described which comprises means for effecting angular and rectilinear adjustment of a templet so as to modify the shape trimmed to the operating portion of the grinding wheel.

Other objects and features of the invention will become apparent as the description proceeds, especially when taken in conjunction with the accompanying drawings, illustrating a preferred embodiment of the invention, wherein:

FIGURE 2 is a sectional view on the line 2—2, FIGURE 1.

FIGURE 3 is a plan view of the trimmer with parts broken away.

FIGURE 4 is a fragmentary sectional view on the line 4—4, FIGURE 1.

FIGURE 5 is a fragmentary sectional view on the line 5—5, FIGURE 1.

FIGURE 6 is a fragmentary view on the line 6—6, FIGURE 2.

Figure 1:
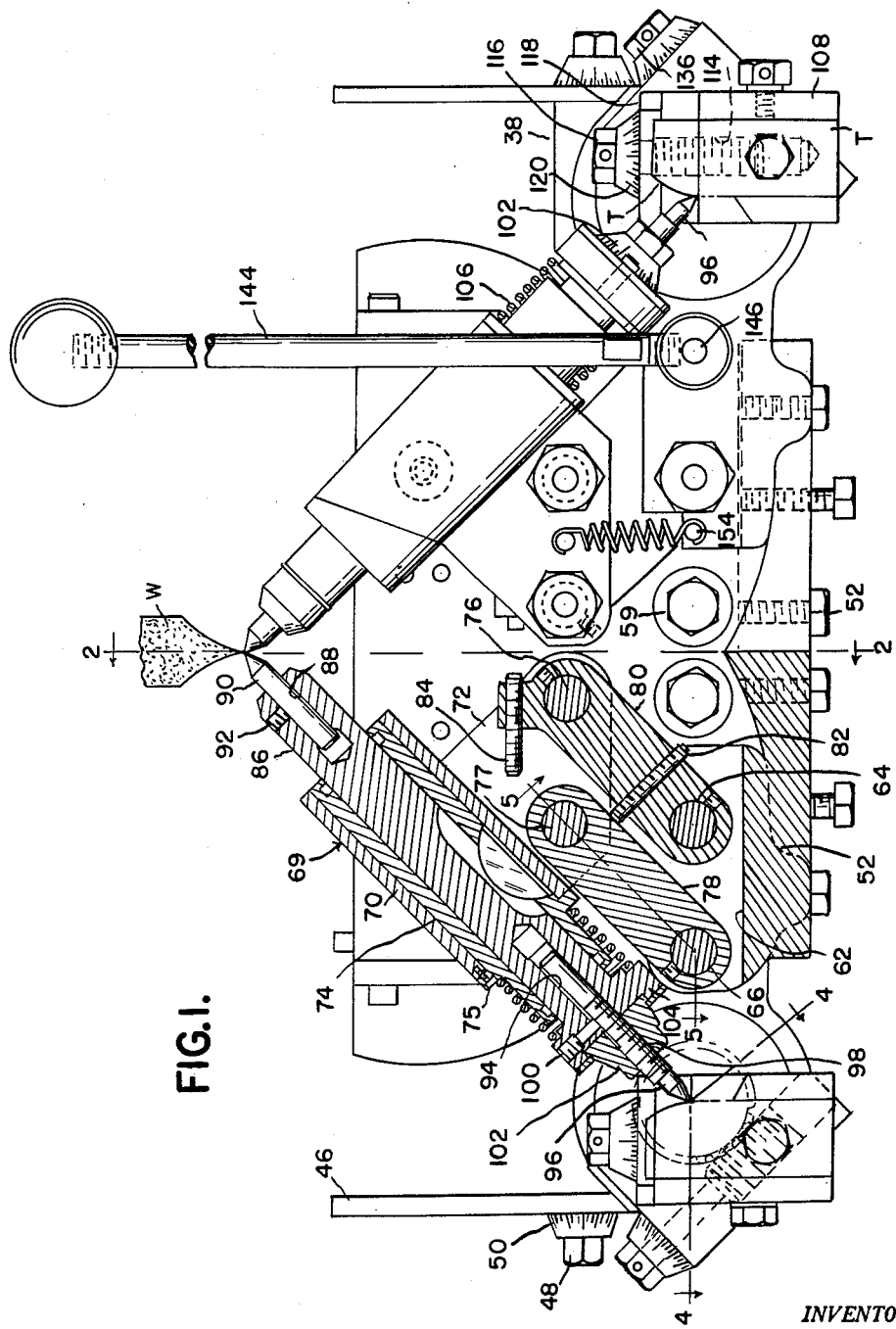
FIGURE 1 is an elevational view of the trimmer mechanism with parts broken away.

The wheel trimmer is associated with a gear grinding machine in which the grinding wheel is adapted to grind the flank or flanks of one of two gear teeth simultaneously. During the gear grinding operation relative traverse between the grinding wheel and work gear is provided in a direction parallel to the axis of the work gear so as to extend the finishing action of the wheel from end to end of the gear teeth. Accordingly, the grinding wheel is required to have one or both edge portions thereof trimmed to the contour corresponding exactly to the profile to be imparted to the gear tooth or teeth by the grinding operation. In practice, the gear grinding machine normally comprises a table having means thereon for supporting a work gear for index rotation and also for lead rotation in case the grinding operation is performed on a helical gear. Spaced from the mechanism for supporting the gear is the trimmer mechanism. When the wheel requires trimming the table is traversed to move the work gear away from the wheel and to bring the trimming mechanism into position directly beneath the wheel.

As best seen in FIGURE 2, a portion of the table is shown at 10 and it will be understood that in operation the table will be traversed in the direction of the arrow 12. Mounted on the table 10 is a stand 14 having ways indicated generally at 16 on which is mounted a pair of slides 18 each one of which is adapted to support an independent wheel trimmer, the wheel trimmers being alternately employed to trim opposite peripheral portions of a grinding wheel, a portion of which is indicated at W in FIGURE 1.

Referring now to FIGURE 3 the mechanism for effecting adjustment of the slides 18 is illustrated. Secured in a recess 20 of the stand 14 is a block 22, the block having flanges 24 bolted or otherwise secured in a recess 26 of the slide 18 by screws or the like 28. The block 22 is provided with an elongated opening 30 in which is fixedly mounted a screw 32, the screw having a head 34 pinned or otherwise fixedly secured in the elongated opening 30 by a pin or the like 36.

Elongated tubular elements 38 are provided, the end portions of which are internally threaded as indicated at 40 and are adapted to be threaded onto the outwardly extending free ends of the screw 32. At their outer ends the tubular elements or members 38 are recessed to receive heads 42 of elements having reduced portions 44 extending through mounting plates 46. Pinned or otherwise secured to each of the reduced portions 44 are an actuating hex head 48 and indicator 50. The mounting plates 46 are fixedly secured to vertical edges of the stand 14 and hence support the elongated tubular elements 38 against axial movement. Accordingly, as the hex head is rotated, thus rotating the tubular elements 38, the associated slide 18 is moved toward and away from the vertical plane passing through the median plane of the grinding wheel. It will be observed that in FIGURE 1 the slides are shown in abutting position and from this position they may be moved apart to any desired position.

Referring now particularly to FIGURES 2 and 6 there is illustrated the mounting of the carrier 52 for angular adjustment about the axis of a pivot mounting formed by a pivot pin 54 having a pivot portion extending through the slide 18 and through a circular opening in the carrier 52. Each of the slides 18 is provided with an arcuate T-slot 56 receiving a nut 58 which cooperates with a clamping screw 59. To indicate the position of angular adjustment of the carrier 52 there is provided on the carrier a pointer 60 which is movable over a graduated scale 61 formed on an adjacent portion of the associated slide 18.

Each of the carriers 52 includes a forwardly projecting yoke portion providing an upwardly open channel at 62, as best seen in FIGURE 2. Extending across each of the channels 62 are a pair of pivot pins 64 and 66.

Each of the carriers 52 supports for movement an elongated housing 69 comprising an outer tubular element 70 having a pair of laterally extending flanges or brackets 72 and an inner tubular element 74 secured to the outer tubular element as by the screws indicated at 75. Extending between the pair of flanges 72 of each elongated housing 69 are a pair of pivot pins 76 and 77. Parallel linkage comprising a first link 78 extending between pins 66 and 77, and a second link 80 extending between pivot pins 64 and 76 are provided, thus providing a parallel linkage support which controls movement of the elongated housing 69 so as to maintain its longitudinal axis oriented in space.

By a proper selection of the location and length of the links 78 and 80, it will be possible to cause diamond supporting structure carried by the elongated housing 69 to move in an arc closely approximating the involute or other contour to be imparted to the periphery of the grinding wheel.

The link 80 is provided with a threaded abutment pin 82 engageable with the link 78 to limit movement of the elongated housing 69 to the position shown in FIGURE 1. Similarly, a second threaded abutment pin 84 is provided on the link 80 which is engageable with the link 78 to limit swinging movement of the elongated housing in the opposite direction.

Longitudinally slidable within the inner tubular member 74 of the elongated housing 69 is a shaft 86 having at one end a recess 88 for the reception of a diamond trimming element 90 which is adjustably secured in position by a set screw 92. At its opposite end the shaft 86 is recessed as indicated at 94 to receive the inner end of a stylus 96 an intermediate portion of which is threaded as indicated at 98. A pin 100 is threaded in a recess in the shaft 86 and has a flat inner end engageable with a flattened side of the threaded portion of the stylus to prevent rotation of the stylus. Adjustment of the stylus longitudinally of the shaft 86 is accomplished by a nut 102 retained against axial displacement in a recess at the end of the shaft 86 by a plate 104. The nut 102, as best seen at the right of FIGURE 1, is graduated so as to facilitate accurate endwise adjustment of the stylus 96.

Compression springs 106 are provided extending between the elongated housing 69 and a radial flange on the shaft to bias the shaft toward a templet T which will now be described.

Referring now to FIGURE 4, the templet T is shown as received in a holder 108 by suitable means such for example as a set screw 110. The holder is mounted for rectilinear adjustment in an angular adjustable templet support 112. As best seen in FIGURE 1, the holder 108 is provided with an internally threaded opening 114 which receives the threaded shank of an adjusting screw 116 mounted on a plate 118 forming a part of the templet support 112. The screw 116 includes a hex head and an indicator dial 120, as best illustrated in FIGURE 1.

The templet support 112 includes a cylindrical stem 122 to which is keyed a worm gear 124. Also keyed to the stem 122 is a graduated plate 126. The carrier 52, as best illustrated in FIGURE 6, is provided with an opening 130 which receives an adjusting worm 132 carried by a shaft 134 fixed to an adjusting hex head 136 associated with an indicating dial 138. Rotation of the worm 132 of course results in rotation of the stem 122 and accordingly, rotates the templet support 112 together with the templet holder 108, the foregoing adjustment permitting the involute or other templet forms to be angularly adjusted and to be rectilinearly adjusted, which latter adjustment is vertical when the parts are in the adjusted position illustrated in FIGURE 1.

Each of the diamond trimmers 90 is adapted to be independently operated and for this purpose the pin 66 has an extension 140 to the outer end of which is affixed an operating handle 142.

The trimmer mechanism seen at the right of FIGURES 1 and 3 is identical with that shown at the left except for the fact that the operating handle 144 is provided which is affixed to a relatively short extension 146.

In order to bias the elongated housings 69 to the position illustrated in FIGURE 1, a tension spring 150 is provided extending between a pin 152 fixed to the flange 72 of the elongated housing and a pin 154 extending outwardly from the yoke portion of the carrier 52.

While the adjustments are for the most part facilitated by the use of graduated dials, nevertheless ultimate accuracy in setting is obtained by the provision of gauge pins such for example as the pair of pins indicated at 156 by means of which the angular adjustment of the templet may be determined by a micrometer gauge.

The drawings and the foregoing specification constitute a description of the improved wheel trimmer in such full, clear, concise and exact terms as to enable any person skilled in the art to practice the invention, the scope of which is indicated by the appended claims.

What we claim as our invention is:

1. A wheel trimmer comprising a housing, a diamond and templet follower carried by said housing for rectilinear movement relative thereto, said diamond and templet follower having an axis coincidental with the principal axis of said housing, a templet having a curved surface in position to be engaged by said templet follower, and parallel linkage means for moving said housing in a direction transverse to its length while preserving its orientation.

2. A wheel trimmer comprising an elongated housing having an opening extending longitudinally therethrough, a shaft reciprocable in said opening, a diamond at one end of said shaft, a follower on the other end of said shaft, said diamond and said follower each having its principal axis parallel to the longitudinal axis of said housing, a templet having a curved surface in position to be engaged by said follower, and parallel linkage means for shifting said housing in a direction transverse to its length without disturbing its orientation.

3. A wheel trimmer comprising an elongated housing having an opening extending longitudinally therethrough, a shaft reciprocable in said opening, a diamond at one end of said shaft, a follower on the other end of said shaft, said diamond and said follower each having is principal axis parallel to the longitudinal axis of said housing, a templet having a curved surface in position to be engaged by said follower, first means for shifting said housing in a direction transverse to its length without disturbing its orientation, and second means independent of said first means mounting said templet for adjustment about an axis perpendicular to the longitudinal axis of said elongated housing.

4. A wheel trimmer comprising an elongated housing having an opening extending longitudinally therethrough, a shaft reciprocable in said opening, a diamond at one end of said shaft, a follower on the other end of said shaft, a templet having a curved surface in position to be engaged by said follower, means for shifting said housing in a direction transverse to its length without disturbing its orientation, and means mounting said templet for rectilinear adjustment in a path oblique to the longitudinal axis of said elongated housing.

5. A wheel trimmer comprising an elongated housing having an opening extending longitudinally therethrough, a shaft reciprocable in said opening, a diamond at one end of said shaft, a follower on the other end of said shaft, a templet having a curved surface in position to be engaged by said follower, means for shifting said housing in a direction transverse to its length without disturbing its orientation, and means mounting said templet for adjustment about an axis perpendicular to the longitudinal axis of said elongated housing and for rectilinear adjustment in a path oblique to the longitudinal axis of said elongated housing.

6. A gear grinder comprising a work support and a wheel support, a grinding wheel on said wheel support, a trimmer on said work support, means for relatively traversing said supports to bring said trimmer into and out of cooperating position relative to said wheel, said trimmer comprising a templet having a curved contour thereon identical in shape but of opposite curvature from the contour to be trimmed onto a lateral edge portion of said wheel, said templet being disposed to one side of said wheel, an elongated holder having an opening therethrough having one end adjacent the wheel and the other end adjacent the templet, a member slidably received in said holder having a diamond at one end and a templet follower at the other end, and means for moving said holder transverse to its length in a direction to cause said templet follower to follow the curvature of said templet.

7. A gear grinder comprising a work support and a wheel support, a grinding wheel on said wheel support, a trimmer on said work support, means for relatively traversing said supports to bring said trimmer into and out of cooperating position relative to said wheel, said trimmer comprising a templet having a curved contour thereon identical in shape but of opposite curvature from the contour to be trimmed onto a lateral edge portion of said wheel, said templet being disposed to one side of said wheel, an elongated holder having an opening therethrough having one end adjacent the wheel and the other end adjacent the templet, a member slidably received in said holder having a diamond at one end and a templet follower at the other end, and means for moving said holder transverse to its length in a direction to cause said templet follower to follow the curvature on said templet, said means comprising parallel linkage having links of a length approximately equal to the approximate radius of curvature of the curve on said wheel and pivoted in position to cause the diamond end of said holder to move in substantial parallelism to the curve on said wheel.

8. A wheel trimmer for a grinding wheel comprising a support, a slide adjustably mounted on said support in a direction parallel to the axis of the grinding wheel, a carrier pivoted to said slide for angular adjustment about an axis perpendicular to the axis of the grinding wheel, an elongated housing having a longitudinal axis mounted on said carrier, a diamond and templet follower carried by said housing for rectilinear movement relative thereto, a templet on said carrier having a curved surface in position to be engaged by said follower, and means on said carrier for moving said housing in a direction transverse to its length without disturbing its orientation.

9. The wheel trimmer defined in claim 8 wherein means are provided for mounting said templet on said carrier for rectilinear adjustment in a path oblique to the longitudinal axis of said elongated housing.

10. The wheel trimmer defined in claim 8 wherein means are provided for mounting said templet on said carrier for adjustment about an axis perpendicular to the longitudinal axis of said elongated housing and for rectilinear adjustment in a path oblique to the longitudinal axis of said elongated housing.

11. The wheel trimmer defined in claim 8 wherein said last named means comprises parallel linkage having links of a length approximately equal to the approximate radius of curvature of the curve on the grinding wheel and pivoted to said carrier in position to cause the diamond follower of said housing to move in substantial parallelism to the curve on the grinding wheel.

12. A wheel trimmer for a grinding wheel comprising a support, a slide adjustably mounted on said support in a direction parallel to the axis of the grinding wheel, a carrier pivoted to said slide for angular adjustment about an axis perpendicular to the axis of the grinding wheel, an elongated housing mounted on said carrier, means for moving said housing in a direction transverse to its length, an elongated shaft slidably mounted in said housing and having a templet following stylus at one end and a diamond trimmer at the other end, a templet adjustably mounted on said carrier, and means for effecting angular and rectilinear adjustment of said templet so as to modify the trim on the periphery of the grinding wheel.

13. A wheel trimmer defined in claim 12 wherein said first mentioned means comprises a parallel linkage having links of a length approximately equal to the approximate radius of curvature of the curve on the grinding wheel and pivoted to said carrier in position to cause the diamond trimmer on said shaft to move in substantial parallelism to the curve on the grinding wheel.

14. A wheel trimmer defined in claim 12 wherein resilient means are provided between said housing and said shaft for biasing said shaft in a direction to hold said following stylus against said templet.

15. A wheel trimmer defined in claim 12 wherein resilient means independent of said first mentioned means are provided between said housing and said carrier for urging said housing to a predetermined position.

16. A wheel trimmer defined in claim 12 wherein the means for effecting angular adjustment of said templet includes a worm and worm gear mounted on said carrier.

17. An apparatus for trimming grinding wheels by means of trimming diamonds, in which an elongated trimming diamond element is guided along a templet by means of a templet device, characterized in that the trimming diamond element is movable so as to follow the guide surface of the templet, and means for maintaining the direction of the longitudinal axis of said trimming diamond element comprising parallel guide links which include a pair of link members which are approximately equal in length to the radius of curvature of the profile to be produced on the grinding wheel, said link members being rotatably mounted in such a manner that the trimming diamond provided on said trimming diamond element moves substantially parallel to the profile to be produced on the grinding wheel.

18. An apparatus defined in claim 17 characterized in that the templet device is angularly adjustable about an axis at right angles to the longitudinal axis of the trimming diamond element.

19. An apparatus defined in claim 17 characterized in that the templet device is movable, by means of an adjusting screw, in a straight line inclined relative to the longitudinal axis of the trimming diamond element.

20. A trimmer for a grinding wheel comprising an elongated support, a diamond and a templet follower carried by said support for rectilinear movement relative thereto, a templet having a curved surface in position to be engaged by said follower, and movable parallel linkage means mounted independently of said support for moving said support in a direction transverse to its length through an arcuate path with said follower in contact with the curved surface on said templet to produce an arcuate profile on the wheel, with the axis of said support always pointing in the same direction throughout the entire movement thereof.

21. A trimmer for a grinding wheel comprising an elongated support, a diamond and a templet follower carried by said support for rectilinear movement relative thereto, a templet having a curved surface in position to be engaged by said follower, and movable parallel linkage means mounted independently of said support for moving said support in a direction transverse to its length through an arcuate path with said follower in contact with the curved surface on said templet to produce an arcuate profile on the wheel, with the axis of said support always pointing in the same direction throughout the entire movement thereof, said parallel linkage means comprising a pair of link members which are approximately equal in length to the radius of curvature of the profile to be produced on the grinding wheel.

22. A trimmer for a grinding wheel comprising an elongated support, a diamond and a templet follower carried by said support for rectilinear movement relative thereto, a templet having a curved surface in position to be engaged by said follower, and movable parallel linkage means mounted independently of said support for moving said support in a direction transverse to its length through an arcuate path with said follower in contact with the curved surface on said templet to produce an arcuate profile on the wheel, with the axis of said support always pointing in the same direction throughout the entire movement thereof, said parallel linkage means comprising a pair of link members which are approximately equal in length to the radius of curvature of the profile to be produced on the grinding wheel, said link members being rotatably mounted in such a manner that the diamond provided on said support moves substantially parallel to the profile to be produced on the grinding wheel.

References Cited in the file of this patent

UNITED STATES PATENTS

| | | |
|---|---|---|
| 2,258,568 | Flygare | Oct. 7, 1941 |
| 2,274,543 | Gruenberg | Feb. 24, 1942 |
| 2,332,560 | Davis | Oct. 26, 1943 |
| 2,358,393 | Greve | Sept. 19, 1944 |
| 2,807,255 | Brady | Sept. 24, 1957 |

FOREIGN PATENTS

| | | |
|---|---|---|
| 240,933 | Great Britain | Oct. 14, 1925 |
| 700,800 | Great Britain | Dec. 9, 1953 |
| 789,728 | Great Britain | Jan. 29, 1958 |